United States Patent [19]

Chang

[11] Patent Number: 4,663,420

[45] Date of Patent: May 5, 1987

[54] POLYETHEROXY-SUBSTITUTED POLYPHOSPHAZENE PURIFICATION

[75] Inventor: Suae-Chen Chang, Baton Rouge, La.

[73] Assignee: Ethyl Corporation, Richmond, Va.

[21] Appl. No.: 820,087

[22] Filed: Jan. 21, 1986

[51] Int. Cl.$^4$ ............................................. C08G 73/00
[52] U.S. Cl. ................................... 528/168; 528/494; 528/497; 528/499; 528/500; 528/502
[58] Field of Search .............. 528/168, 494, 497, 499, 528/500, 502

[56] References Cited

U.S. PATENT DOCUMENTS

| | | | |
|---|---|---|---|
| 4,128,710 | 12/1978 | Fieldhouse et al. | 528/168 |
| 4,129,529 | 12/1978 | Fieldhouse et al. | 528/169 |
| 4,258,173 | 3/1981 | Schulz et al. | 528/399 |
| 4,267,311 | 5/1981 | Elefritz, Jr. | 528/168 |
| 4,567,229 | 1/1986 | Pettigrew et al. | 528/168 |

Primary Examiner—Morton Foelak
Assistant Examiner—M. L. Moore
Attorney, Agent, or Firm—Donald L. Johnson; John F. Sieberth; J. D. Odenweller

[57] ABSTRACT

Polyetheroxy-substituted polyphosphazenes having reduced mono and polyetheroxy alkanol, alkali metal and halide contaminants that are suitable for use in making solid electrolytes are made by dissolving the impure polyphosphazene in an inert solvent (e.g. tetrahydrofuran) and mixing this solution with a cycloalkane (e.g. cyclohexane) to precipitate the polyetheroxy-substituted polyphosphazene with reduced etheroxy alkanol content. This can be dissolved in water and contacted with an anion exchange material to remove residual halide anions. The purified polyetheroxy-substituted polyphosphazene is then recovered by distilling off the water.

20 Claims, No Drawings

POLYETHEROXY-SUBSTITUTED POLYPHOSPHAZENE PURIFICATION

BACKGROUND OF THE INVENTION

Polyetheroxy-substituted polyphosphazenes are known polymers. Their preparation is reported in Schulz et al. U.S. Pat. No. 4,258,173. They can be made by reacting a mono or polyetheroxy alkanol with a polyphosphonitrilic chloride in the presence of triethylamine to take up the evolved HCl. Alternatively, they can be made by reacting a sodium mono or polyetheroxy alkoxide with polyphosphonitrilic chloride in tetrahydrofuran. The polymers are utilized to form films, moldings, coatings, foams, and the like.

More recently a new utility for these polyetheroxy-substituted polyphosphazene has been reported by P. M. Blonsky, D. F. Shriver, P. Austin and H. R. Allcock, J. Am. Chem. Soc., 106, 6854 (1984). These authors describe solid electrolytes for use in electrical apparatus such as batteries which are made using polyetheroxy-substituted polyphosphazenes which are complexed with lithium, silver, sodium, rubidium, calcium, strontium, zinc, gadolinium or neodynium salts. In this electrolyte use it has been found that it is important that impurities be reduced to a very low level. When made by conventional methods, such as the reaction of sodium mono or polyetheroxy alkoxide with polyphosphonitrilic chloride, the resultant polymer contains high levels of mono or polyetheroxy alkanol, sodium and chloride impurities which are detrimental to the use of the polymer in electrolyte applications.

SUMMARY OF THE INVENTION

It has now been discovered that mono and polyetheroxy alkanol, alkali metal and halide content of polyetheroxy-substituted polyphosphazenes can be sharply reduced by conducting the reaction of an alkali metal mono or polyetheroxy alkoxide with a polyphosphonitrilic halide in an inert ether solvent, neutralizing residual alkoxide with acid, and coagulating the polymer by mixing the ether solution with a cycloalkane. Further purification can be achieved by dissolving the precipitated polymer in water, contacting the aqueous solution with an ion exchange resin to remove halide and metal ions and recovering the polyetheroxy-substituted polyphosphazene from the aqueous solution by evaporating or distilling off the water.

Description of the Preferred Embodiments

A preferred embodiment of the invention is a process for making a polyetheroxy-substituted polyphosphazene which is substantially free of alkali metal and mono or polyetheroxy alkanol, said process comprising the steps of:

(a) reacting a polyphosphonitrilic halide with an alkali metal mono or polyetheroxy alkoxide in an inert solvent in which polyetheroxy-substituted polyphosphazene is soluble to form a crude polyetheroxy-substituted polyphosphazene solution, and (b) co-mingling the crude solution with a cycloalkane in which mono and polyetheroxy alkanols are soluble to precipitate the polyetheroxy-substituted polyphosphazene substantially free of mono or polyetheroxy alkanols.

The polyphosphonitrilic halide used in the initial reaction are known substances. They can be made by heating highly purified cyclic phosphonitrilic halide trimer at about 225°–250° C. for 12–48 hours. Optionally a small amount of a catalyst such as aluminum chloride, boron chloride, iron chloride and the like can be included. When properly made, the polyphosphonitrilic halide is a substantially linear polymer which is soluble in tetrahydrofuran, cyclohexane and benzene. Crosslinked polymers are insoluble in these common solvents and have little use since they are very difficult to substitute with other groups. The preferred linear polyphosphonitrilic halides contain about 10 to about 500,000 ($PNX_2$ units) in which X is halogen, most preferably chlorine.

The polyphosphonitrilic halide is reacted with an alkali metal mono or polyetheroxy alkoxide having the formula

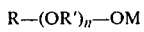

$$R-(OR')_n-OM$$

wherein M is an alkali metal, R is alkyl, aryl, cycloalkyl, alkaryl, or aralkyl, R' is a divalent aliphatic hydrocarbon group and n is an integer from 1 to 70. When R is alkyl it can contain from 1 to 20 or more carbon atoms. Some examples are methyl, ethyl, n-propyl, isopropyl, n-butyl, isobutyl, sec-butyl, n-pentyl, 2-methylbutyl, n-dodecyl, 2-ethyldecyl, n-hexadecyl, 2-ethyltetradecyl, 2-ethyloctadecyl, n-eicosyl and the like.

When R is aryl it can contain 6 to 20 or more carbon atoms and can be substituted or unsubstituted such as phenyl, α-naphthyl, 4-phenylphenyl, 4-methoxyphenyl, 4-ethoxyphenyl, 4-butoxyphenyl, 4-(2-ethoxyethoxy)-phenyl, 4-nitrophenyl, 2-acetylphenyl, 2-acetyloxyphenyl, 4-phenoxyphenyl and the like.

When R is cycloalkyl it can contain from 5 to 12 or more carbon atoms. Some examples of these are cyclopentyl, cyclohexyl, cyclooctyl, cyclododecyl and the like.

When R is alkaryl it can contain from 7 to 20 or more carbon atoms. Some examples of these are o-tolyl, o-ethylphenyl, 4-sec-butylphenyl, 4-n-decylphenyl, 2,4-dimethylphenyl, 2,4-di(2-ethylhexyl)phenyl, 2,4,6-trimethylphenyl, 4-tetradecylphenyl and the like.

When R is aralkyl it can contain from 7 to 20 or more carbon atoms. Some examples of these are benzyl, α-methylbenzyl, α,α-dimethylbenzyl, phenethyl, 4-phenylbutyl, 6-(2-methylphenyl)hexyl and the like.

R' can be any divalent aliphatic hydrocarbon group. These include alkylene groups containing from 2 to 20 or more carbon atoms and especially the lower alkylene groups containing about 2–4 carbon atoms such as ethylene $-CH_2CH_2-$, 1,2-propylene $-CH(CH_3)CH_2-$, 1,2-butylene $-CH_2CH(C_2H_5)-$ and the like.

Some examples of the alkoxides are sodium 2-methoxyethoxide, sodium 2-ethoxyethoxide, potassium 2-ethoxybutoxide, potassium 2-(ethoxyethoxy)ethoxide, sodium 2-phenoxyethoxide, sodium 2-(2-phenoxyethoxy)ethoxide, sodium polyethoxyethoxide (n=12), potassium 2-(cyclohexoxyethoxy)ethoxide, potassium 2-[2-(4-methoxyphenoxy)ethoxy]ethoxide, sodium 2-[2-(2-chlorophenoxy)propoxy]propoxide and the like.

In a more preferred embodiment R is an alkyl and R' is a lower alkylene. In a still more preferred embodiment R is a lower alkyl containing 1 to about 4 carbon atoms, R' is a lower alkylene containing 2–4 carbon atoms, M is sodium and n is an integer from 1 to 10 and still more preferably from 2 to 6. In a most preferred embodiment R is methyl or ethyl, R' is ethylene $-CH_2CH_2-$, M is sodium and n is 2–4.

It is not necessary that all of the phosphorus substituents are the polyetheroxy groups. Preferably at least 80 mole percent of the phosphorus substituents are the above R—(OR')$_n$—O— groups. The remaining groups can be substituted or unsubstituted $C_{1-12}$ alkoxy, $C_{6-12}$ aryloxy, $C_{5-12}$ cycloalkoxy, $C_{7-12}$ alkaryloxy or $C_{7-12}$ aralkoxy wherein the substituents can be halogen, hydroxyl, amine, alkylamine, dialkylamine, alkoxy, aryloxy and the like. More preferably at least 90 mole percent of the phosphorus substituents are polyetheroxy groups and most preferably substantially all of the phosphorus substituents are polyetheroxy groups.

The polyphosphonitrilic halide and alkali metal mono or polyetheroxy alkoxide are reacted in an inert solvent in which both reactants and the polyetheroxy-substituted polyphosphazene product are soluble. Preferred solvents of this class are the mono and polyethers such as tetrahydrofuran (THF), dioxane, dimethoxyethane, diethoxyethane, di-methoxyethyl ether (diglyme) and the like. The preferred solvent is THF.

The amount of solvent should be enough to dissolve the reactants and products. A useful range is about 1–50 parts by weight solvent per each part reactant. A more preferred range is about 5–10 parts solvent per part reactant.

The amount of alkali metal mono or polyetheroxy alkoxide should be sufficient to react with all or most of the halogen bonded to phosphorus. A useful range is about 0.9–1.2 equivalents of mono or polyetheroxy alkoxide per equivalent of halide. A more preferred range is about 1.0–1.1 equivalent of mono or polyetheroxy alkoxide per equivalent of halogen.

The polyphosphonitrilic halide is usually added to an ether or polyether solvent of the alkali metal mono or polyetheroxy alkoxide. The polyphosphonitrilic halide is frequently diluted with a solvent such as THF or cyclohexane to make handling easier and aid in the reaction. When it is diluted with a solvent such as cyclohexane and added to an ether or polyether solution of the alkali metal mono or polyetheroxy alkoxide, a mixed solvent results. The amount of ether or polyether should be sufficient to maintain the polyetheroxy-substituted polyphosphazene in solution.

The substitution reaction proceeds by replacing the halogen with the mono or polyetheroxy alkoxide groups forming alkali metal halide byproduct. This reaction is usually complete in about 4–8 hours at about 5°–150° C. In THF it is preferably conducted at reflux. The reaction mixture is then preferably neutralized by adding an acid such as sulfuric acid. This converts any unreacted alkali metal mono or polyetheroxy alkoxide to an alkali metal salt (e.g. $Na_2SO_4$) and mono or polyetheroxy alkanol.

Following the substitution reaction and neutralization, the salt is in very finely divided form. In order to grow larger salt particles a small amount of a saturated aqueous salt solution is preferably added and stirred into the mixture. An amount equal to about 1–10 weight percent of the reaction mixture is usually sufficient. The preferred salt used to form the saturated solution is sodium bromide.

The reaction mixture is next filtered or centrifuged to remove the salt precipitate. The solids-free reaction solution is then mixed with a cycloalkane to coagulate and precipitate the polyetheroxy-substituted polyphosphazene. This may be done by adding cycloalkane to the ether solution or by adding the ether solution to the cycloalkane. The preferred mode is to add the ether solution to the cycloalkane which causes the substituted polyphosphazene to precipitate. Any residual mono or polyetheroxy alkanol remains in solution. The amount of cycloalkane used can vary widely. A useful range is about 1–10 and preferably 1–2 times the volume of the ether reaction solution. The cycloalkanes include cyclopentane, cyclohexane, cycloheptane, cyclooctane, cyclododecane and the like. The preferred cycloalkane is cyclohexane. The precipitated polyetheroxy-substituted polyphosphazene gum is separated from the cycloalkane-ether solvent mixture which retains the residual mono or polyetheroxy alkanol in solution. The gum is then dried preferably under vacuum.

Further purification of the polyphosphazene gum can be achieved by dissolving the polyphosphazene gum in water and contacting the aqueous solution with ion exchange resins. These are resins such as polystyrene having either sulfonic acid or quaternary ammonium hydroxide sites. The sulfonic acid sites adsorb cations (e.g. sodium) and the quaternary ammonium sites exchange hydroxyl for anions (e.g. halides). A preferred anioncation exchange resin is Amberlite ® IRN-150 (Rohm and Haas Company) ion exchange resin, a 1:1 mixture of sulfonic acid cation exchange resin and quaternary ammonium anion exchange resin.

After treatment with the ion exchange resins, the water is removed by evaporation or distillation. This is readily accomplished by adding an immiscible hydrocarbon such as toluene and azeotroping a water-toluene mixture. Finally the remaining polyphosphazene gum is dried under vacuum to remove residual toluene and any other volatile material.

In the above discussion, the initial crude polyetheroxy-substituted polyphosphazene was made by reacting alkali metal mono or polyetheroxy alkoxide with polyphosphonitrilic halide in an inert solvent such as ether (e.g. THF). This is not an essential part of the purification process and the initial polyetheroxy-substituted polyphosphazene can be obtained by any method. For example it can be made as in Schulz et al. U.S. Pat. No. 4,258,173 by reaction of a mono or polyetheroxy alkanol with polyphosphonitrilic chloride in the presence of a tert-amine. No matter how it is made, it can be purified by a process for purifying a polyetheroxy-substituted polyphosphazene said process comprising:

(a) forming a solution of said polyetheroxy-substituted polyphosphazene in a mono or polyether solvent and (b) mixing the solution of (a) with a cycloalkane in an amount which coagulates the purified polyetheroxy-substituted polyphosphazene gum.

The following examples serve to show how the purification procedure is conducted.

EXAMPLE 1

Sodium Salt of 2-(2-Methoxyethoxy)Ethanol

In a reaction flask was placed 69.78 grams (3.03 gram atoms) of sodium metal and 852 grams of dry tetrahydrofuran (THF) under a nitrogen atmosphere. To this was added a solution of 480.6 grams (3.33 moles) of 2-(2-methoxyethoxy)ethanol in 852 grams of dry THF while stirring at room temperature over a 20 minute period. The temperature was then raised to 65° and stirring continued until all of the sodium had reacted (2 days).

EXAMPLE 2

Synthesis of 2-(2-Methoxyethoxy)Ethoxy Polyphosphazene ("MEEP")

In a reaction flask was placed 898.4 grams of a THF solution of sodium 2-(2-methoxyethoxy)ethoxide containing 1.15 moles of the ethoxide salt. To this was added 414.3 grams of cyclohexane, a solution of linear polyphosphonitrilic chloride (limiting viscosity number, LVN 0.94, 14.06 weight percent solids, 0.5 gram moles [PNCl$_2$] units) over a 6.3 minute period. The mixture was refluxed for 6 hours. The reaction mixture was cooled and neutralized with 7.35 grams of con. sulfuric acid to pH 7.0. To part of the neutralized solution (approximately 650 grams) was added 500 ml of cyclohexane causing a light yellow tacky polymer (MEEP) to precipitate. The MEEP was dissolved in distilled water and the resulting 10 weight percent aqueous solution was passed through a cation and anion exchange resin (Rohm and Haas Company Amberlite ® 1RN150-1). The aqueous solution was then evaporated under a vacuum. Analysis showed that the MEEP contained less than 35 ppm (parts per million) total chloride and 26 ppm sodium.

To the remainder of the neutralized solution was added a saturated aqueous sodium bromide solution to agglomerate salt. This was centrifuged to remove the salt and then the polymer was precipitated by adding 500 mls of cyclohexane. This portion of the MEEP contained 0.041 weight percent total chloride and very little methoxyethoxyethanol. Dissolving the MEEP in THF and again precipitating with cyclohexane reduces the alcohol content to almost zero.

Other polyetheroxy substituents may be attached to the polyphosphazene backbone by following the above general procedure but substituting different mono or polyetheroxy alkanols such as

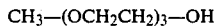
CH$_3$—(OCH$_2$CH$_2$)$_3$—OH

CH$_3$CH$_2$—(OCH$_2$CH$_2$)$_4$—OH

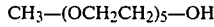
CH$_3$—(OCH$_2$CH$_2$)$_5$—OH and the like.

The purification process can also be applied to other water-soluble polyphosphazenes that present the same clean-up problem in removing impurities corresponding to the substituent group due to the water solubility of the polyphosphazene itself. The water wash as used in the prior art is not practical since the polymer itself can dissolve in the water. Typical water soluble polyphosphazenes include those in which the substituent groups bonded to phosphorus are —NR$_1$R$_2$ wherein R$_1$ is C$_{1-4}$ alkyl and R$_2$ is hydrogen or C$_{1-4}$ alkyl, —X—(CH$_2$)$_3$—N(CH$_3$)$_2$ wherein X is

—O— or —NH—, —NH—CH$_2$—C(O)O—C$_2$H$_5$,

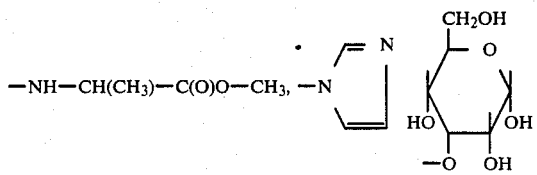
—NH—CH(CH$_3$)—C(O)O—CH$_3$,

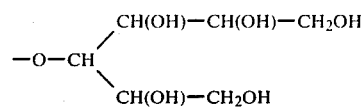

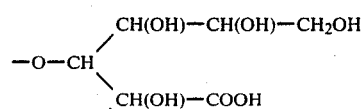

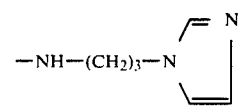

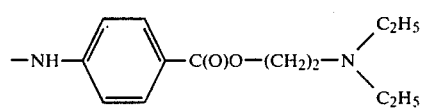

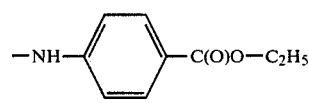

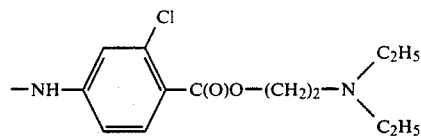

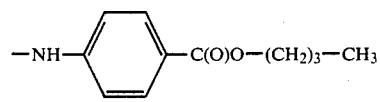

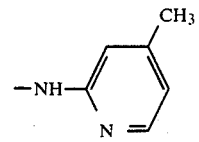

and the like including quaternary ammonium salts such as those resulting from reaction of alkyl chlorides or bromides with phosphorus substituent groups containing amine function and also polyphosphazenes have two or more types of the above substituents in the same polymer molecules.

I claim:

1. A process for purifying a polyetheroxy-substituted polyphosphazene said process comprising:
   (a) forming a solution of said polyetheroxy-substituted polyphosphazene in a mono or polyether solvent and
   (b) mixing the solution of (a) with a cycloalkane in an amount which coagulates the purified polyetheroxy-substituted polyphosphazene gum.

2. A process of claim 1 wherein said polyetheroxy substituents have the formula

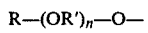
R—(OR')$_n$—O— wherein R is alkyl, aryl, cycloalkyl, alkaryl or aralkyl, R' is a divalent aliphatic hydrocarbon group and n is an integer from 1 to 70.

3. A process of claim 2 wherein R is a lower alkyl containing 1-4 carbon atoms, R' contains 2-4 carbon atoms and n is an integer from 1 to 10.

4. A process of claim 3 wherein said cycloalkane is cyclohexane.

5. A process of claim 4 wherein said solvent is tetrahydrofuran.

6. A process of claim 5 wherein R' is —CH$_2$CH$_2$— and n is an integer from 2 to 6.

7. A process of claim 6 wherein R is methyl.

8. A process for making a polyetheroxy-substituted polyphosphazene which is substantially free of mono or polyetheroxy alkanol, said process comprising the steps of:
 (a) reacting a polyphosphonitrilic halide with an alkali metal mono or polyetheroxy alkoxide in an inert solvent in which polyetheroxy-substituted polyphosphazene is soluble to form a crude polyetheroxy-substituted polyphosphazene solution, and
 (b) co-mingling the crude solution with a cycloalkane in which mono and polyetheroxy alkanols are soluble to precipitate the polyetheroxy-substituted polyphosphazene substantially free of mono or polyetheroxy alkanols.

9. A process of claim 8 wherein said polyphosphonitrilic halide is a substantially linear polyphosphonitrilic chloride containing 10 to about 500,000 (PNCl$_2$) units.

10. A process of claim 9 wherein said inert solvent is a mono or polyether.

11. A process of claim 10 wherein said inert solvent is tetrahydrofuran.

12. A process of claim 11 wherein said alkali metal is sodium.

13. A process of claim 9 wherein said polyetheroxy substituent has the formula:

R—(OR')$_n$—O— wherein R is alkyl, aryl, cycloalkyl, alkaryl, or aralkyl, R' is a divalent aliphatic hydrocarbon group and n is an integer from 1 to 70.

14. A process of claim 13 wherein at least 80 mole percent of the polyphosphazene substituent groups are said R—(OR')$_n$—O— groups and any remaining polyphosphazene substituents are alkoxy, aryloxy, cycloalkoxy, alkaryloxy or aralkoxy groups which substituents can be substituted with halogen, hydroxyl, amine, alkylamine, dialkylamine, alkoxy and aryloxy.

15. A process of claim 14 wherein said inert solvent is a mono or polyether and said alkali metal is sodium.

16. A process of claim 15 wherein said inert solvent is tetrahydrofuran.

17. A process of claim 15 wherein said cycloalkane is cyclohexane.

18. A process of claim 17 wherein said inert solvent is tetrahydrofuran.

19. A process of claim 8 including the subsequent steps of
 (c) dissolving the precipitated polyetheroxy-substituted polyphosphazene in water,
 (d) contacting the water solution with an anionic exchange resin capable of removing halide anions and
 (e) recovering polyetheroxy-substituted polyphosphazene that is substantially free of mono and polyetheroxy alkanol, alkali metal and halogen.

20. A process of claim 19 wherein said polyphosphonitrilic halide is a high molecular weight substantially linear polyphosphonitrilic chloride, said inert solvent is a mono or polyether, said cycloalkane is cyclohexane, said mono or polyetheroxy alkoxide substituent has the formula:

R—(OR')$_n$—O— wherein R is alkyl, aryl, cycloalkyl, alkaryl or aralkyl, R' is a divalent aliphatic hydrocarbon group and n is an integer from 1 to 70.

* * * * *